United States Patent
Kobuna

(10) Patent No.: US 9,557,628 B2
(45) Date of Patent: Jan. 31, 2017

(54) ACTUATOR DRIVING DEVICE FOR EXECUTING POSITIVE AND NEGATIVE ENERGIZATION METHOD UNDER PULSE WIDTH MODULATION CONTROL

(71) Applicant: CANON KABUSHIKI KAISHA, Tokyo (JP)

(72) Inventor: Hiroyo Kobuna, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 50 days.

(21) Appl. No.: 14/305,528

(22) Filed: Jun. 16, 2014

(65) Prior Publication Data
US 2014/0368677 A1 Dec. 18, 2014

(30) Foreign Application Priority Data

Jun. 18, 2013 (JP) .................... 2013-127862

(51) Int. Cl.
| | |
|---|---|
| G03B 13/34 | (2006.01) |
| H02P 25/034 | (2016.01) |
| H02P 29/00 | (2016.01) |
| H02P 6/10 | (2006.01) |

(52) U.S. Cl.
CPC ............ *G03B 13/34* (2013.01); *H02P 25/034* (2016.02); *H02P 29/0038* (2013.01); *G03B 2205/0069* (2013.01); *H02P 6/10* (2013.01)

(58) Field of Classification Search
CPC ...... G03B 2205/0053–2205/0084; G03B 7/10; G03B 13/34; G02B 7/04–7/105; H02K 41/0354–41/0358; H02P 25/028; H02P 25/034; H02P 29/0038; H02P 6/10

USPC ............... 348/357; 396/133–136; 310/12.16
See application file for complete search history.

(56) References Cited

U.S. PATENT DOCUMENTS

| | | | | |
|---|---|---|---|---|
| 6,229,402 B1 * | 5/2001 | Kataoka | ............... | H02N 2/142 310/316.01 |
| 6,812,618 B2 * | 11/2004 | Hayashi | .................. | H02N 2/14 310/316.01 |
| 8,665,344 B2 | 3/2014 | Shimada et al. | | |
| 2002/0096970 A1 * | 7/2002 | Hayashi | ................. | H02N 2/145 310/316.02 |

(Continued)

FOREIGN PATENT DOCUMENTS

| | | |
|---|---|---|
| JP | 2011-221519 A | 11/2011 |
| JP | 2012-028841 A | 2/2012 |

*Primary Examiner* — Dennis Hogue
(74) *Attorney, Agent, or Firm* — Cowan, Liebowitz & Latman, P.C.

(57) ABSTRACT

An actuator driving device drives an actuator connected to an output terminal. The control unit of the actuator driving device includes a PWM delay time setting unit, a first duty ratio setting unit, and a second duty ratio setting unit. The PWM delay time setting unit sets a delay time of pulse width modulation control for a driving voltage to be applied to the output terminal and outputs setting information to the first and second duty ratio setting units. The first duty ratio setting unit sets the first duty ratio for a first PWM output unit, and the second duty ratio setting unit sets the second duty ratio for a second PWM output unit. When positive and negative energization is performed, the control unit controls to reduce the amount of change in current in the current peak of a PWM waveform by providing a short-circuit period in response to the energization amount.

9 Claims, 4 Drawing Sheets

(56) References Cited

U.S. PATENT DOCUMENTS

| | | | |
|---|---|---|---|
| 2011/0234887 A1 | 9/2011 | Shimohata et al. | |
| 2012/0147255 A1* | 6/2012 | Yasuda | G03B 3/10 |
| | | | 348/352 |
| 2012/0257099 A1* | 10/2012 | Tsai | G02B 7/08 |
| | | | 348/349 |
| 2014/0111703 A1* | 4/2014 | Luff | G02B 26/101 |
| | | | 348/759 |

* cited by examiner

PRIOR ART

ACTUATOR DRIVING DEVICE FOR EXECUTING POSITIVE AND NEGATIVE ENERGIZATION METHOD UNDER PULSE WIDTH MODULATION CONTROL

BACKGROUND OF THE INVENTION

Field of the Invention

The present invention relates to an actuator driving device to be applied to an imaging apparatus or the like and a method for controlling the same.

Description of the Related Art

Conventionally, a positive and negative energization method under PWM (Pulse Width Modulation) control due to duty ratio-current characteristics with high linearity has been used as an actuator driving device. However, CMOS (complementary metal-oxide semiconductor) sensors have often been used as imaging elements in recent years, which may lead to the occurrence of phenomenon in which magnetic field noise caused by a change in current under PWM control adversely affects on electric charge information of an imaging element. The cause of the readily occurrence of noise when the positive and negative energization method under PWM control is employed lies in the repetition of energization in the forward direction and energization in the backward direction by adjusting the width of onpulse over a certain period of time. A change in driving current is large, and thus, a change in magnetic flux becomes large accordingly. In particular, a change in magnetic flux is maximized at the time of the rise and the fall of a driving voltage upon PWM driving, resulting in an increase in actuation voltage due to electromagnetic induction.

In order to prevent the phenomenon, Japanese Patent Laid-Open No. 2012-28841 discloses an imaging apparatus that includes an imaging element which photoelectrically converts an object image into electric charge information, an actuator which drives a correction lens for correcting hand shake, and a control unit which changes the driving frequency of the actuator at the timing for reading out electric charge information from the imaging element. When the current image taking mode is a mode in which magnetic field noise is produced by a driving device, the current image taking mode is set to another mode at a frequency in which no magnetic noise is generated. This can suppress the influence of noise caused by a change in magnetic field in response to the actuation of the actuator on electric charge information.

Japanese Patent Laid-Open No. 2011-221519 discloses an actuator driver that is switchable to output either an analog signal or a digital signal in response to the object condition at the time of shooting. The imaging apparatus includes an imaging element, at least one lens which forms an object image on the imaging element, and an actuator which drives at least one lens based on a control signal. A driver for outputting a control signal switches whether to output an analog signal or to output a digital signal in response to the object condition at the time of shooting. When the brightness of captured image is set to the condition, the driver outputs a digital signal, i.e., a PWM signal if the brightness at the time of shooting is equal to or greater than a predetermined level. At this time, even if the captured image is contaminated by noise, such noise gives only small adverse effect on the captured image, and thus, the captured image is less affected thereby. Power consumption at the time of driving the actuator can be saved as compared with the case where an analog signal is used. When the brightness at the time of shooting is less than a predetermined level, the driver switches output to an analog signal. In the case of analog driving, power consumption increases due to low power efficiency at the time of driving the coil, but the influence of magnetic field noise from the driving coil to the imaging element can be suppressed.

However, in general, a high driving frequency for the actuator for driving a hand shake correction lens may lead to switching loss, whereas a low driving frequency may cause an increase in current ripple, an appropriate frequency band exists for the actuator. Thus, in the method for changing a driving frequency in response to the image taking mode as disclosed in Japanese Patent Laid-Open No. 2012-28841, the motor characteristics are not constant. In order to stabilize the motor characteristics, the driving frequency of the hand shake correction lens needs to be constant, but the method has the disadvantage of maintaining the driving frequency at a constant level.

In Japanese Patent Laid-Open No. 2011-221519, a change in current is suppressed by using a continuously changing analog signal, resulting in a reduction in the influence of magnetic noise. However, Japanese Patent Laid-Open No. 2011-221519 does not disclose a solution when a digital signal, i.e., a PWM signal is used, and thus, a fundamental solution is not yet attained thereby due to high power consumption.

SUMMARY OF THE INVENTION

The present invention reduces magnetic field noise caused by the amount of change in current when an actuator is driven.

According to an aspect of the present invention, an actuator driving device is provided that includes a first output terminal and a second output terminal configured to energize a driving coil of an actuator; an output unit configured to apply a driving voltage to each of the first output terminal and the second output terminal; and a control unit configured to control a driving voltage output from the output unit. The control unit performs control such that a current flows through the driving coil in a first direction in a first energization period, a current flows through the driving coil in a second direction opposite to the first direction in a second energization period, and no potential difference is generated between the first output terminal and the second output terminal in a short-circuit period between the first energization period and the second energization period.

According to the present invention, magnetic field noise caused by the amount of change in current may be reduced when an actuator is driven.

Further features of the present invention will become apparent from the following description of exemplary embodiments with reference to the attached drawings.

DESCRIPTION OF THE EMBODIMENTS

Hereinafter, a description will be given by taking an example in which the driving control of an actuator is executed by the positive and negative energization method under pulse width modulation control according to an embodiment of the present invention. Note that the actuator driving device according to the present embodiment is applicable to an imaging apparatus including optical elements and an optical member constituting a lens barrel. In this case, the optical elements are a hand shake correction lens, a focus lens, a zoom lens, and the like, and the optical member is a movable member such as a cam tube. Upon application of the present invention to an imaging apparatus, the driving mechanism unit may be configured in any suitable manner, and thus, a description thereof will be omitted.

Figure 1:
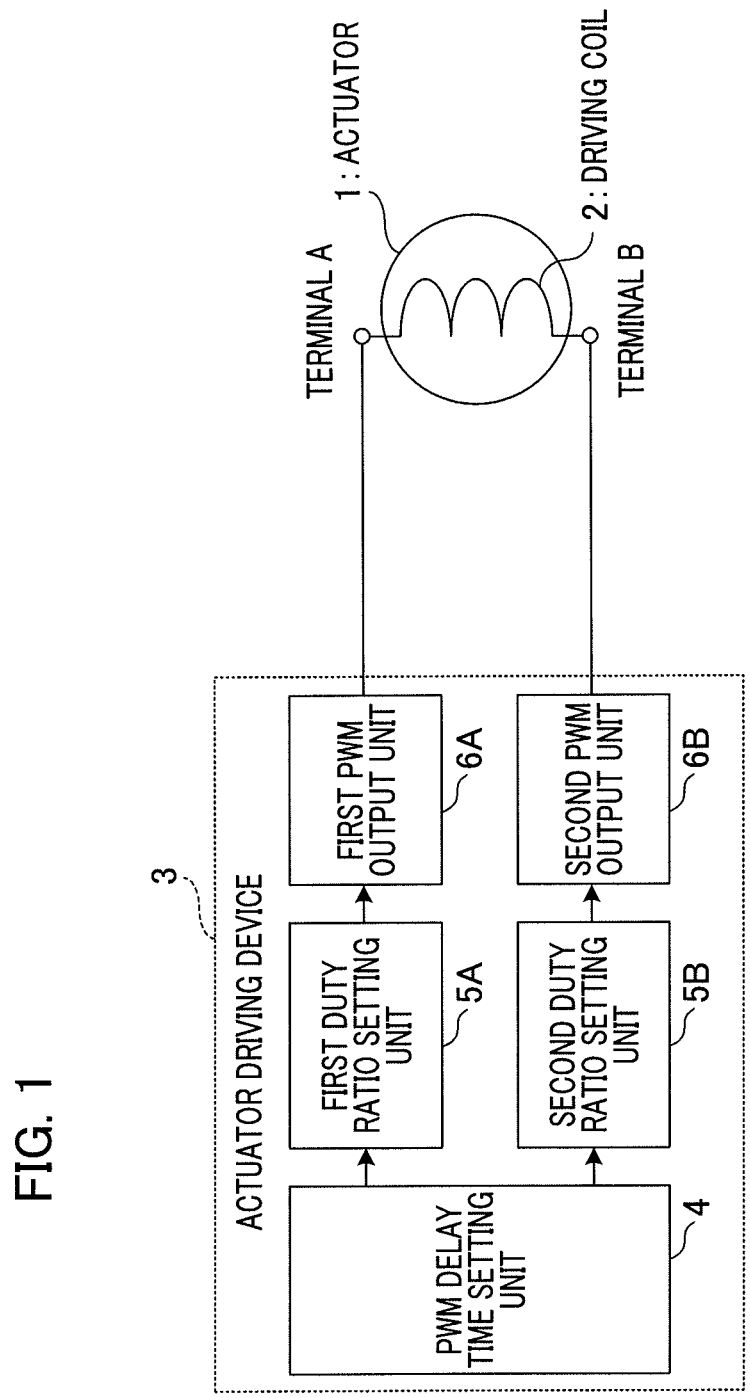
FIG. 1 is a block diagram illustrating an exemplary configuration of a device according to an embodiment of the present invention.

FIG. 1 is a block diagram illustrating an exemplary configuration of an actuator driving device according to an embodiment of the present invention. An actuator 1 has a driving coil 2, and the coil terminals of the actuator 1 are connected to the output terminals A and B of an actuator driving device 3. In FIG. 1, the first output terminal A is denoted as "terminal A", and the second output terminal B is denoted as "terminal B".

The actuator driving device 3 sets a short-circuit time in response to the set duty ratio, and then outputs a pulse width modulation (PWM) signal. The actuator driving device 3 includes a PWM delay time setting unit 4, duty ratio setting units 5A and 5B, and PWM output units 6A and 6B. The PWM delay time setting unit 4, the first duty ratio setting unit 5A, and the second duty ratio setting unit 5B constitute a control unit for controlling a driving voltage to be output from each output unit.

The PWM delay time setting unit 4 sets a delay time of pulse width modulation control, and then outputs setting information to the first duty ratio setting unit 5A and the second duty ratio setting unit 5B. The first duty ratio setting unit 5A sets the duty ratio (first duty ratio is denoted as Duty (A)) of the first driving voltage to be applied to the first output terminal A via the first PWM output unit 6A. The second duty ratio setting unit 5B sets the duty ratio (second duty ratio is denoted as Duty (B)) of the second driving voltage to be applied to the second output terminal B via the second PWM output unit 6B.

Next, a description will be given of an operation in the present embodiment. Assume the case where the actuator driving device 3 outputs terminal voltages shown in FIG. 2. The waveforms A and B shown in FIG. 2 indicate the terminal voltages of the terminals A and B, respectively. The driving current waveform of the driving coil 2 is illustrated thereunder.

For example, both Duty (A) and Duty (B) are set to 50%. In this case, a terminal voltage periodically changes between the High (hereinafter abbreviated as "H") and Low (hereinafter abbreviated as "L") levels at the ratio of 1:1. The PWM delay time setting unit 4 sets a delay time such that the timing of the rise of a voltage at the terminal A and the timing of the fall of a voltage at the terminal B offset by one fourth period (T/4). At this time, the energization amount "i" can be determined by the phase relationship between outputs from the terminal A and the terminal B.

Figure 2:
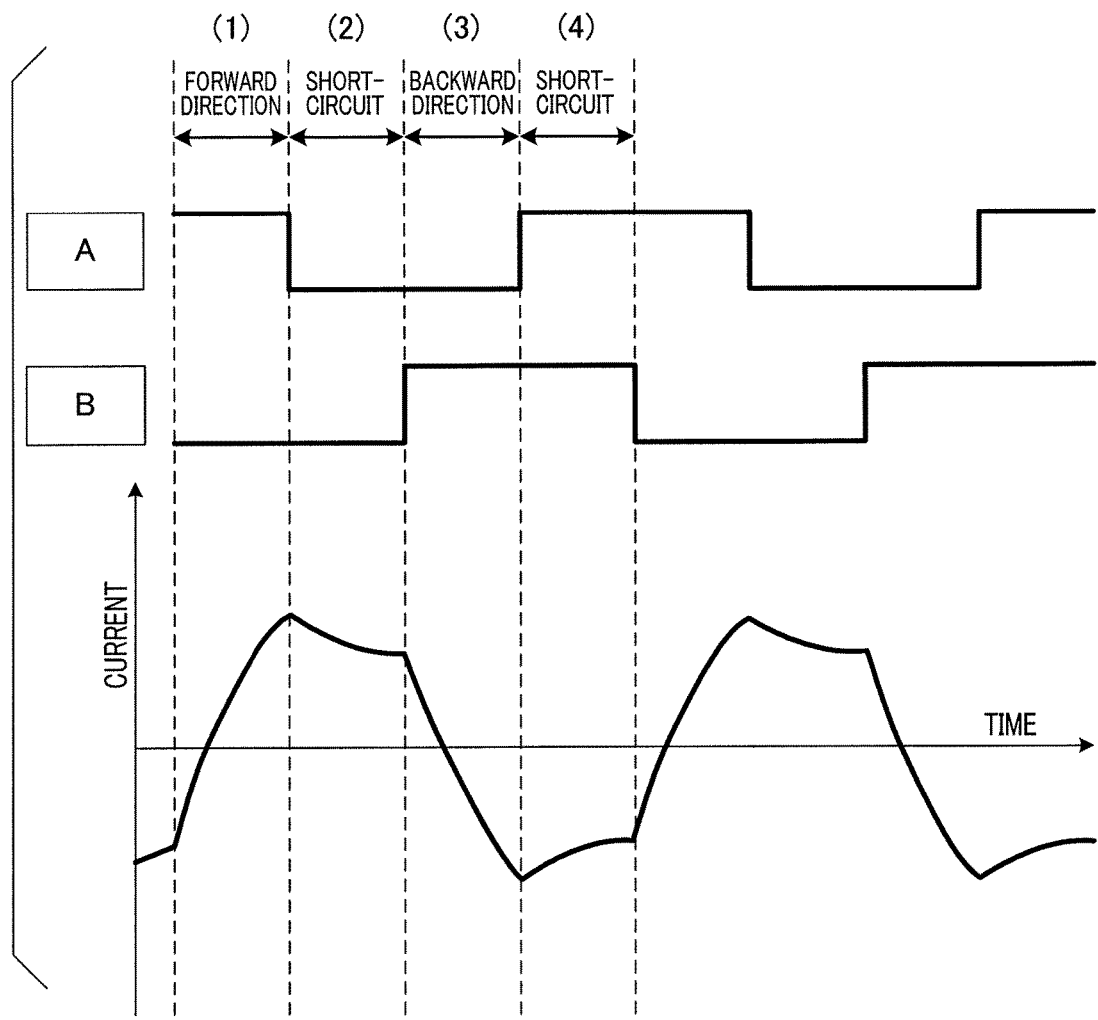
FIG. 2 is a diagram illustrating PWM signals and a current waveform according to an embodiment of the present invention.

FIG. 2 shows four states of a level phase between terminal voltages.

(1) A state where the voltage at the terminal A is H and the voltage at the terminal B is L (first energization period).

A potential difference is generated between the terminal A and the terminal B, current flows in a first direction (forward direction) from the terminal A to the terminal B.

(2) A state where the voltage at the terminal A is L and the voltage at the terminal B is L (first short-circuit period).

Since no potential difference is generated because the potentials at both terminals are equal, the terminals are in a short-circuited state.

(3) A state where the voltage at the terminal B is H and the voltage at the terminal A is L (second energization period).

Current flows in a second direction (backward direction) from the terminal B to the terminal A.

(4) A state where the voltages at the terminal A and the terminal B are both H (second short-circuit period).

Since no potential difference is generated because the potentials at both terminals are equal, the terminals are in a short-circuited state.

The above four states change by arbitrarily setting the duty ratio of the terminal B and the amount of timing delay in switching between the terminal A and the terminal B. The control unit determines the first short-circuit period and the second short-circuit period in response to the energization amount "i" corresponding to the amount of current to be flown through the driving coil 2.

The actuator driving device 3 performs control such that the length of the first energization period in (1) is equal to the length of the first short-circuit period in (2) and also performs control such that the length of the second energization period in (3) is equal to the length of the second short-circuit period in (4). For that purpose, setting is made such that the following relationship is satisfied between the first duty ratio Duty (A) and the second duty ratio Duty (B) (duty ratio is represented by percentage (%)).

$$\text{Duty }(A)=100-\text{Duty }(B) \qquad \text{[Formula 1]}$$

In other words, the first duty ratio and the second duty ratio are set such that the sum of them is to be 100%.

Next, a description will be given of the timing setting made by the PWM delay time setting unit 4. The PWM delay time setting unit 4 sets a delay time (denoted as "tl") of the timing of the fall of the second driving voltage at the terminal B relative to the rise of the first driving voltage at the terminal A as shown in the following formula:

When $0\% \le \text{Duty }(B) \le 50\%$, $$tl=((\text{Duty }(B)/2)\times T$$

When $50\% \le \text{Duty }(B)\ 100\%$, $$tl=((-(\text{Duty }(B)/2)+50)\times T \qquad \text{[Formula 2]}$$

where the symbol "T" denotes a period.

When the relationship shown in [Formula 1] and [Formula 2] is satisfied, the energization amount "i" is represented by the following formula, where "i" is proportional to a difference between the first duty ratio and the second duty ratio.

$$i=(\text{Duty }(A)-\text{Duty }(B))\times Im \qquad \text{[Formula 3]}$$

Note that the direction of current flow from the terminal A to the terminal B is defined as positive. The symbol Im denotes the maximum amount of current to be flown when the voltages at the terminals are fixed to H and L in one period.

The energization states in one period of a PWM waveform in the present embodiment are as shown in Table 1.

TABLE 1

| Energization amount i [%] | Duty (A) [%] | Duty (B) [%] | (H, H) Short-circuit [%] | (H, L) CW [%] | (L, L) Short-circuit [%] | (L, H) CCW [%] |
|---|---|---|---|---|---|---|
| 100 | 100 | 0 | 0 | 100 | 0 | 0 |
| 80 | 90 | 10 | 5 | 85 | 5 | 5 |
| 60 | 80 | 20 | 10 | 70 | 10 | 10 |
| 40 | 70 | 30 | 15 | 55 | 15 | 15 |
| 20 | 60 | 40 | 20 | 40 | 20 | 20 |
| 0 | 50 | 50 | 25 | 25 | 25 | 25 |
| −20 | 40 | 60 | 20 | 20 | 20 | 40 |
| −40 | 30 | 70 | 15 | 15 | 15 | 55 |
| −60 | 20 | 80 | 10 | 10 | 10 | 70 |
| −80 | 10 | 90 | 5 | 5 | 5 | 85 |
| −100 | 0 | 100 | 0 | 0 | 0 | 100 |

In Table 1, (H, H) represents the state in (4), (H, L) represents the state in (1), (L, L) represents the state in (2), and (L, H) represents the state in (3). The symbol CW denotes a rotational direction corresponding to the first direction of the actuator and the symbol CCW denotes a rotational direction corresponding to the backward direction of the first direction.

Figure 3:
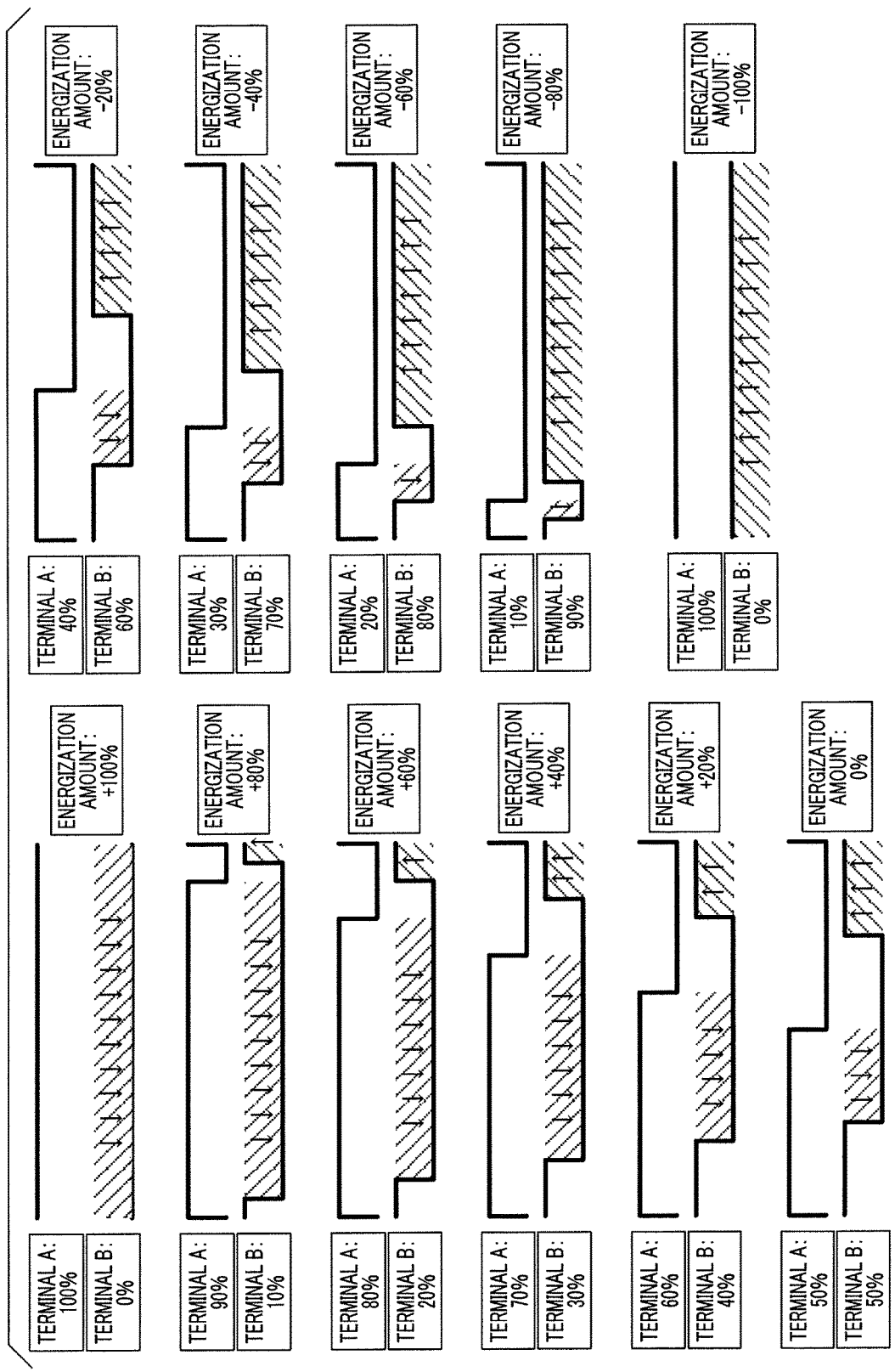
FIG. 3 is a diagram illustrating the relationship among a terminal voltage, a duty ratio, and the energization amount according to an embodiment of the present invention.

FIG. 3 is a diagram illustrating the relationship among terminal voltages at the terminals A and B, a duty ratio thereof, and the energization amount, where time in one period is plotted on the horizontal axis. In FIG. 3, the shaded parts correspond to the energization amount, arrows pointing downward represent a positive value, and arrows pointing upward represent a negative value. The control unit determines a short-circuit period using the energization amount (positive value, zero, and negative value in FIG. 3) corresponding to a difference between the amount of current in the first direction indicated by the arrows pointing downward and the amount of current in the second direction indicated by the arrows pointing upward. FIG. 2 shows the case where the energization amount in one period is zero, which corresponds to the case where both of the first duty ratio and the second duty ratio are 50%.

Next, a description will be given of a change over time of driving current. Here, assume that FIG. 3 represents waveforms from the nth period (n is a variable for a natural number) to the next (n+1)th period. The period of a PWM signal is denoted by T, and each duty ratio is 50%. It is also assumed that the timing of the fall of the voltage at the terminal B is delayed from the timing of the rise of the voltage at the terminal A by T/4. The state of the terminal A and the terminal B in this case is partitioned into four states:

(Terminal A, terminal B) (H, L), (L, L), (L, H), and (H, H). These states correspond to the states in (1) to (4), respectively.

Firstly, the time of the fall of the driving voltage at the terminal B is set to a time nT in the first energization period (H, L). In other words, the first energization period is a period until time (n+¼)T elapses from time nT as a starting point, an equation representing the current i(t) as a function of time t is as follows:

[Formula 1]

$$i(t) = \frac{E}{R}\left(1 - \text{EXP}\left(-\frac{R}{L}(t-nT)\right)\right) + i(nT)\text{EXP}\left(-\frac{R}{L}(t-nT)\right) \quad \text{(Formula 1.1)}$$

In (Formula 1.1), the symbol "E" denotes a driving voltage, the symbol "R" denotes a resistance value of the actuator 1, and the symbol "L" denotes an inductance of the actuator 1. The symbol "EXP( )" represents an exponential function.

From (Formula 1.1), the current i(t) exponentially increases and becomes the maximum value (denoted as "$i_{max}$") when the time t becomes (n+¼)T. The maximum value $i_{max}$ at this time is as follows:

[Formula 2]

$$i_{max} = i\left(\left(n+\frac{1}{4}\right)T\right) = \frac{E}{R}\left(1 - \text{EXP}\left(-\frac{R}{L}\cdot\frac{T}{4}\right)\right) + i(nT)\text{EXP}\left(-\frac{R}{L}\cdot\frac{T}{4}\right)$$

In the first short-circuit period (L, L), the driving voltage at the terminal A changes from H to L, so that the terminal A and the terminal B are in a short-circuited state. Thus, the current i(t) in the first short-circuit period is represented by the following formula:

[Formula 3]

$$i(t) = i\left(\left(n+\frac{1}{4}\right)T\right)\text{EXP}\left(-\frac{R}{L}\left(t-\left(n+\frac{1}{4}\right)T\right)\right) \quad \text{(Formula 1.2)}$$

From (Formula 1.2), the current i(t) exponentially decreases. A magnitude of the rate of decrease in the current i(t) is smaller than a magnitude of the rate of increase in the current i(t) represented by (Formula 1.1).

In the second energization period (L, H), the driving voltage at the terminal B changes from L to H, so that a voltage is applied to the actuator 1. Thus, the current i(t) in the second energization period is represented by the following formula:

[Formula 4]

$$i(t) = -\frac{E}{R}\left(1 - \text{EXP}\left(-\frac{R}{L}\left(t-\left(n+\frac{1}{2}\right)T\right)\right)\right) + i\left(\left(n+\frac{1}{2}\right)T\right)\text{EXP}\left(-\frac{R}{L}\left(t-\left(n+\frac{1}{2}\right)T\right)\right) \quad \text{(Formula 1.3)}$$

From (Formula 1.3), the current i(t) exponentially decreases. A magnitude of the rate of decrease in the current i(t) is greater than a magnitude of the rate of decrease in the current i(t) represented by (Formula 1.2). The current i(t) becomes the minimum value (denoted as "$i_{min}$") when the time t becomes (n+3/4)T. The minimum value $i_{min}$ at this time is represented by the following formula:

[Formula 5]
$$i_{min} = i\left(\left(n + \frac{3}{4}\right)T\right) = -\frac{E}{R}\left(1 - \text{EXP}\left(-\frac{R}{L} \cdot \frac{T}{4}\right)\right) + i\left(\left(n + \frac{1}{2}\right)T\right)\text{EXP}\left(-\frac{R}{L} \cdot \frac{T}{4}\right)$$

In the second short-circuit period (H, H), the driving voltage at the terminal A changes from L to H, so that the terminal A and the terminal B are in a short-circuited state. Thus, the current i(t) in the second short-circuit period is represented by the following formula:

[Formula 6]
$$i(t) = i\left(\left(n + \frac{3}{4}\right)T\right)\text{EXP}\left(-\frac{R}{L}\left(t - \left(n + \frac{3}{4}\right)T\right)\right) \quad \text{(Formula 1.4)}$$

From (Formula 1.4), the current i(t) exponentially increases. A magnitude of the rate of increase in the current i(t) is smaller than a magnitude of the rate of decrease in the current i(t) represented by (Formula 1.3).

Since the driving current of the actuator 1 repeats four states described in the above (1) to (4), the waveform of the driving current changes while being smoothed into a substantial trapezoidal shape (see FIG. 2). Thus, a change in magnetic field is gradual, resulting in a reduction in magnetic field noise.

Figure 4:
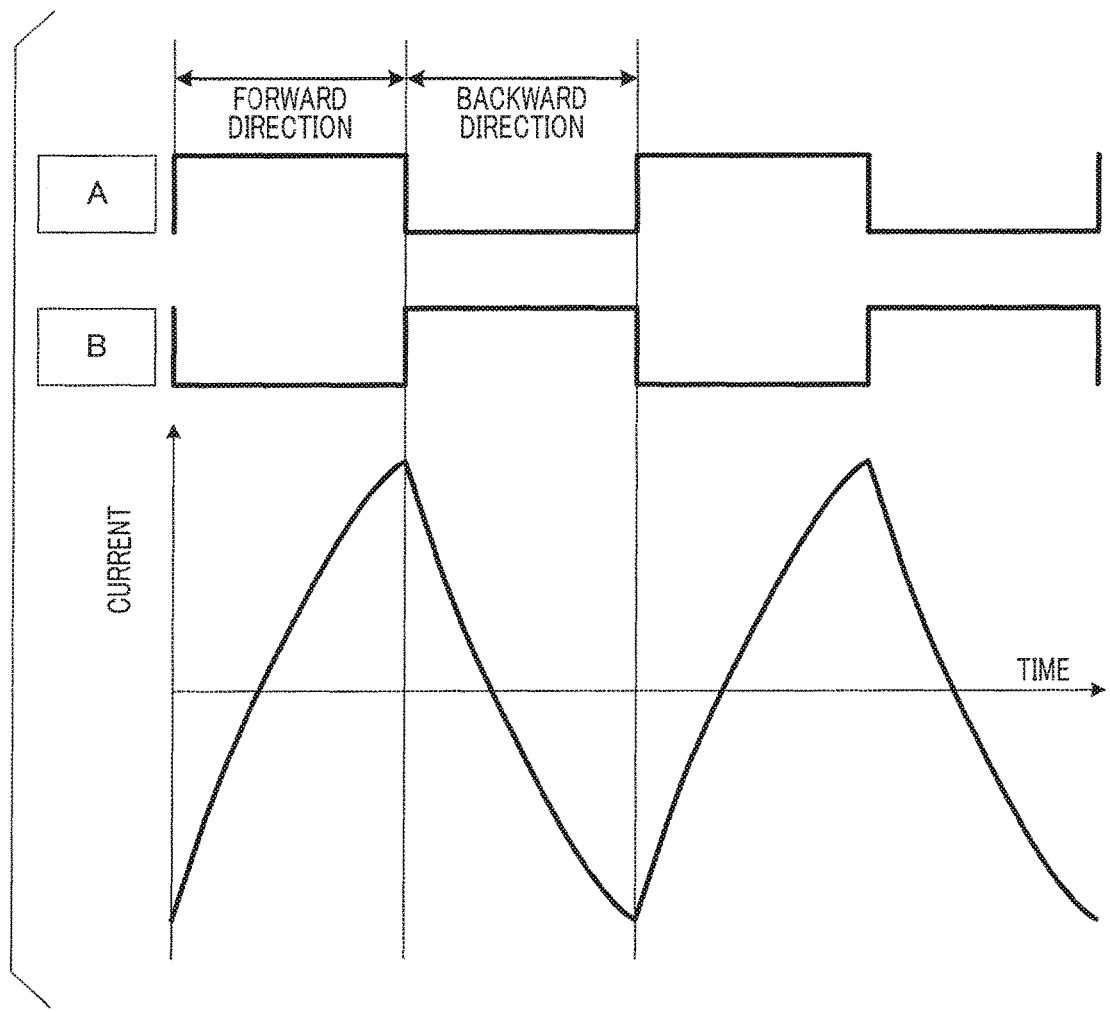
FIG. 4 is a diagram illustrating PWM signals and a current waveform in the conventional technique.

FIG. 4 is a diagram illustrating PWM signals and a current waveform in the conventional technique. FIG. 4 shows the case where the energization amount in one period is zero and the duty ratio is 50%. In the first period during which the voltage at the terminal A is H and the voltage at the terminal B is L, the actuator is driven in the forward direction. On the contrary, in the second period during which the voltage at the terminal B is H and the voltage at the terminal A is L, the actuator is driven in the backward direction. The time of the rise of the voltage at the terminal A and the time of the fall of the voltage at the terminal B are set to time nT.

In the first period, that is, in the period from time nT to (n+½)T, Formula representing the current is the same as the above Formula (1.1). The current value becomes the maximum value (denoted as "$i^*_{MAX}$") at time (n+½)T. The maximum value $i^*_{MAX}$ is as follows:

[Formula 7]
$$i^*_{MAX} = i\left(\left(n + \frac{1}{2}\right)T\right) = \frac{E}{R}\left(1 - \text{EXP}\left(-\frac{R}{L} \cdot \frac{T}{2}\right)\right) + i(nT)\text{EXP}\left(-\frac{R}{L} \cdot \frac{T}{2}\right)$$

In the second period, that is, in the period from time (n+½)T to (n+1)T, Formula representing the current is the same as the above Formula (1.3). The current value becomes the minimum value (denoted as "$i^*_{MIN}$") at time (n+1)T. The minimum value $i^*_{MIN}$ is as follows:

[Formula 8]
$$i^*_{MIN} = i\left(\left(n + \frac{3}{4}\right)T\right) =$$

-continued
$$-\frac{E}{R}\left(1 - \text{EXP}\left(-\frac{R}{L} \cdot \frac{T}{2}\right)\right) + i\left(\left(n + \frac{1}{2}\right)T\right)\text{EXP}\left(-\frac{R}{L} \cdot \frac{T}{2}\right)$$

The current waveform repeats the above two energization patterns, and thus, is in a saw-tooth shape.

As can be seen from the comparison between the maximum values $i_{max}$ and $i^*_{MAX}$ and the comparison between the minimum values $i_{min}$ and $i^*_{MIN}$, the absolute value in difference between the maximum value and the minimum value in the present embodiment is small as compared with that under conventional control.

In the present embodiment, the waveform of current flowing through the driving coil 2 of the actuator 1 is smoothed in a substantial trapezoidal shape under the above control, and thus, the amount of change in current among peak points becomes small as compared with that upon positive and negative energization under conventional PWM control. Thus, magnetic field noise caused by the amount of change in current may be reduced when an actuator is driven by the positive and negative energization method under PWM control.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127862, filed on Jun. 18, 2013, which is hereby incorporated by reference herein in its entirety.

What is claimed is:

1. An actuator driving device, comprising:
a first output terminal and a second output terminal configured to energize a driving coil of an actuator;
an output circuit configured to apply a driving voltage to each of the first output terminal and the second output terminal; and
a setting circuit configured to set and output a first duty ratio, a second duty ratio, and a delay time to the output circuit for controlling an amount of current through the driving coil,
wherein the first duty ratio is set for a first output circuit to apply a first driving voltage and the second duty ratio is set for a second output circuit to apply a second driving voltage,
wherein the delay time is a difference time between an apply timing of the first driving voltage and an apply timing of the second driving voltage, and
wherein the setting circuit determines a length of the short-circuit period by the amount of current to be flowed through the driving coil.

2. The actuator driving device according to claim 1, wherein the setting circuit sets the delay time of the timing of the fall of the second driving voltage relative to the rise of the first driving voltage.

3. The actuator driving device according to claim 1, wherein the setting circuit determines a length of the short-circuit period by a difference between the amount of current in the first direction and the amount of current in the second direction.

4. The actuator driving device according to claim 1, wherein the setting circuit controls the energization amount of the driving coil in the first energization period, a first short-circuit period between the first energization period and the second energization period, the second energization period, a second short-circuit period between the second energization period and the first energization period by setting the first duty ratio, the second duty ratio, and the delay time.

5. The actuator driving device according to claim 4, wherein a first duty ratio setting circuit and a second duty ratio setting circuit set the first duty ratio and the second duty ratio, respectively, such that the sum of the first duty ratio and the second duty ratio is to be 100%.

6. The actuator driving device according to claim 5, wherein the energization amount of the driving coil controlled by the setting circuit is proportional to a difference between the first duty ratio and the second duty ratio.

7. The actuator driving device according to claim 1, wherein the setting circuit performs control such that a current flows through the driving coil in a first direction in a first energization period, a current flows through the driving coil in a second direction opposite to the first direction in a second energization period, and no potential difference is generated between the first output terminal and the second output terminal in a short-circuit period between the first energization period and the second energization period.

8. An imaging apparatus comprising:
the actuator driving device according to claim 1; and
an optical element or an optical member driven by the actuator.

9. A control method to be executed by an actuator driving device comprising a first output terminal and a second output terminal configured to energize a driving coil of an actuator; an output circuit configured to apply a driving voltage to each of the first output terminal and the second output terminal; and a setting circuit configured to set and output a first duty ratio, a second duty ratio, and a delay time to the output circuit for controlling an amount of current through the driving coil, the method comprising:
setting the first duty ratio for a first output circuit to apply a first driving voltage and setting the second duty ratio for a second output circuit to apply a second driving voltage,
wherein the delay time is a difference between time between an apply timing of the first driving voltage and an apply timing of the second driving voltage, and
wherein the setting step determines a length of the short-circuit period by the amount of current to be flowed through the driving coil.

* * * * *